United States Patent [19]
Takebe

[11] Patent Number: 5,941,219
[45] Date of Patent: Aug. 24, 1999

[54] METHOD AND APPARATUS FOR CLEANING EXHAUST GAS BY ALPHA-DECAY

[76] Inventor: Masayuki Takebe, 5-5-16, Hirai, Kusatsu-shi, Shiga-ken, Japan

[21] Appl. No.: 08/915,514

[22] Filed: Aug. 13, 1997

[30] Foreign Application Priority Data

| Aug. 15, 1996 | [JP] | Japan | 8-233609 |
| Aug. 15, 1996 | [JP] | Japan | 8-233610 |
| Oct. 17, 1996 | [JP] | Japan | 8-295772 |
| Oct. 17, 1996 | [JP] | Japan | 8-295773 |

[51] Int. Cl.$^6$ ............................ F02B 51/00; F02M 27/00
[52] U.S. Cl. .......................... 123/536; 123/539; 123/573
[58] Field of Search ..................... 123/536, 537, 123/538, 539; 60/274, 275

[56] References Cited

U.S. PATENT DOCUMENTS

| 3,678,908 | 7/1972 | Ito | 123/539 |
| 5,111,797 | 5/1992 | Shikanai | 123/539 |
| 5,331,807 | 7/1994 | Hricak | 60/275 |

FOREIGN PATENT DOCUMENTS 8-218956   8/1996   Japan .

Primary Examiner—John E. Ryznic
Attorney, Agent, or Firm—Jordan and Hamburg LLP

[57] ABSTRACT

A method for cleaning exhaust gas for internal combustion engines or combustion equipment is provided, which comprises the steps of: irradiating air, which is introduced through the air inlet of the engine or equipment, with α-rays by alpha-decay thereof, to thereby transform diatomic oxygen in the air into a powerful oxidizing active oxygen while transforming, by fission, a part of nitrogen in the air into a monatomic oxygen and monatomic hydrogen, and supplying the combustion equipment or internal combustion engine with the air containing the active oxygen, monatomic oxygen and hydrogen to reduce toxic components from the exhaust gas. An exhaust gas cleaning apparatus for internal combustion engines or other combustion equipment is also provided, which comprises a natural radioactive element which emits 0.001 to 0.6 becquerels of α-rays by alpha-decay thereof. The radioactive element or a device including the same is disposed on the air inlet, exhaust gas outlet or fuel pipe of the equipment or engine to remove toxic components from the exhaust gas.

5 Claims, 3 Drawing Sheets

METHOD AND APPARATUS FOR CLEANING EXHAUST GAS BY ALPHA-DECAY

BACKGROUND OF THE INVENTION

1. Field of the Invention

The present invention relates to a method and apparatus for cleaning exhaust gas exhausted from combustion equipment such as a boiler, incinerator, etc. and internal combustion engines such as a gasoline engine, diesel engine, etc.

2. Description of the Prior Art

The exhaust gas from internal combustion engines such as the gasoline engine, diesel engine, etc. contains various kinds of toxic substances. To improve the rate of fuel consumption and clean the exhaust gas, it has been proposed to use an exhaust gas cleaner using a catalyst, to attain a complete combustion of the fuel by electronically controlling the supply of air and fuel to the engine, etc.

To remove toxic components from the exhaust gas of combustion equipment such as a boiler, incinerator, etc., it has been proposed to use an apparatus which provides a complete combustion of fuel by automatic control of the combustion in the furnace, to provide a stack gas desulfurization and denitration facility, an electric precipitator, etc. in combination with the combustion, etc.

The exhaust gas from internal combustion engines contains carbon monoxide(CO), hydrocarbon(HC), nitrogen oxides($NO_x$), black smoke, etc. It is considered that such toxic components are caused to develop by any of the following:

(1) Incomplete combustion due to insufficient supply of air (2) Dissociative thermo-reaction of carbon dioxide($CO_2$) and steam ($H_2O$) during combustion at an elevated temperature (3) Generation of intermediate products during incomplete combustion The combustion equipment such as a boiler, incinerator, etc. exhausts, together with a large volume of sulfur oxides ($SO_x$) and nitrogen oxides($NO_x$) yielded from a fuel such as oil, coal or the like and coarse particulates and dust resulting from incomplete combustion of the fuel.

The conventional exhaust gas cleaner does not of remove the toxic components satisfactory. The exhaust gas cannot be effectively removed without a plurality of such cleaners in combination. The cleaners require a large space for installation and also large costs.

SUMMARY OF THE PRESENT INVENTION

Accordingly, the present invention has an object to overcome the above-mentioned drawbacks of the prior art by providing a method and apparatus for cleaning exhaust gas, permitting the exhaust gas to be cleaned at low costs and improving the rate of fuel consumption by attaining complete combustion of the fuel. The apparatus does not require a large space for installation and is very easy to install.

The above object is accomplished by providing a method for cleaning exhaust gas, destined for internal combustion engines or other combustion equipment, comprising the steps of irradiating to air through the air passage of the engine or equipment α-rays emerging from a natural radioactive element which emits 0.001 to 0.6 becquerels of α-rays by alpha-decay thereof, to thereby transform diatomic oxygen in the air into a powerful oxidizing active oxygen while transforming, by fission, a part of nitrogen in the air into a monatomic oxygen and monatomic hydrogen, and supplying the combustion equipment or internal combustion engine with the air containing the active oxygen, monatomic oxygen and hydrogen to reduce toxic components from the exhaust gas.

Also the present invention provides an exhaust gas cleaning apparatus for internal combustion engines or other combustion equipment, comprising members each made of a substance containing a natural radioactive element which emits 0.001 to 0.6 becquerels of α-rays by alpha-decay thereof, or a device including the member, and disposed on the air inlet, exhaust gas outlet and fuel pipe of the equipment or engine to remove toxic components from the exhaust gas.

According to the present invention, a part of nitrogen in the air undergoes, when irradiated with α-rays; and a fission-transformation into oxygen and hydrogen so that the oxygen in the air is increased in concentration and the oxygen in the air is transformed into a powerful oxidizing active oxygen.

Also, irradiation of α-rays, β-rays and γ-rays to hydrocarbon in the fuel promotes the decomposition and bridging reactions, which is estimated to be due to the effects of ionization, excitation, etc. of the hydrogen and carbon atoms.

Since the fuel is thus completely burnt by the above-mentioned active oxygen, the toxic substances in the exhaust gas are reduced and thus the exhaust gas is cleaned. That is to say, the method for cleaning the exhaust gas is extremely simple and the cleaning apparatus needs only a small space for installation. The exhaust gas can be cleaned at low costs, and the rate of fuel consumption can be effectively improved.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
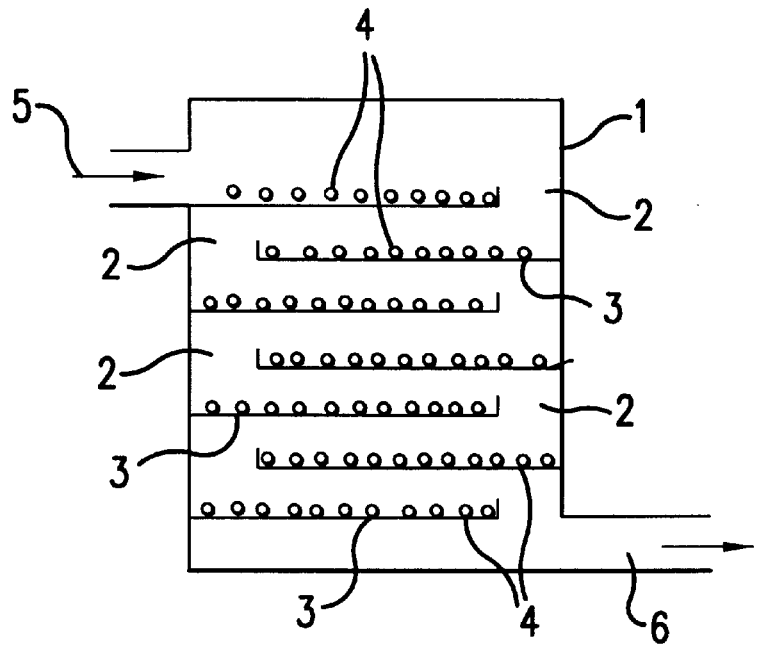
FIG. 1 shows the construction of an active oxygen generator according to the present invention, installed in the air inlet.

FIG. 1 shows the construction of an active oxygen generator installed in the air inlet of combustion equipment such as a boiler, incinerator or the like.

As shown, the active oxygen generator has an enclosure 1 inside which shelves 3 are so laid as to form an air path 2. Granules 4 of a substance containing a radioactive element are dispersed on the shelves 3. The enclosure 1 has an air inlet 5 and outlet 6. Oxygen contained in the air supplied from the air inlet 5 into the enclosure 1 is irradiated with α-rays emerging from the granules 4 and transformed into an active oxygen while nitrogen in the supplied air undergoes a fission-transformation into monatomic oxygen and hydrogen. Thus, the air containing the active oxygen, monatomic oxygen and hydrogen is discharged from the outlet 6 of the enclosure 1.

Figure 2:
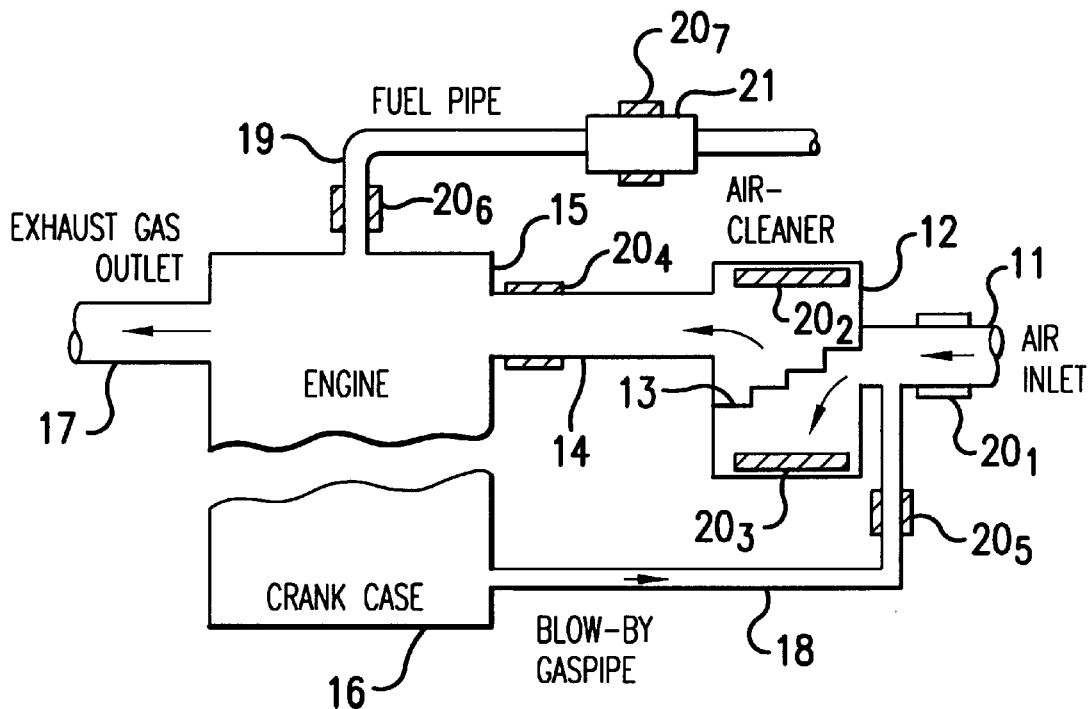
FIG. 2 is an explanatory drawing showing sheets each made of a substance containing a natural radioactive element, installed on the air inlet and fuel pipe of an internal combustion engine.

FIG. 2 shows an example of sheets, each made of a substance containing a natural radioactive element, installed on the air inlet and fuel pipe of an electric-ignition combustion engine.

As shown, the internal combustion engine has an air inlet 11, air-cleaner 12, air-cleaner element (filter) 13, intake pipe 14, combustion chamber 15 consisting of a cylinder and cylinder head and a crank case 16, and an exhaust gas outlet 17. Air is supplied from the air inlet 11 and passed through the filter 13 into the combustion chamber 15 via the intake pipe 14. The combustion gas from the combustion chamber 15 is discharged from the exhaust gas outlet 17.

The combustion gas leaking through the clearance between the piston and ring into the crank case 16 is recirculated to the air cleaner 12 via a blow-by gas pipe 18 to suppress generation of hydrocarbon.

As seen in FIG. 2, sheets $20_1$ to $20_7$, which are made of a substance containing a natural radioactive element, are installed on the air inlet 11, inner top and bottom of the air cleaner 12, a portion of the intake pipe 14 near the engine, blow-by gas pipe 18, fuel a pipe 19 (for transporting fuel to and from the engine) and fuel a filter 21, respectively. The sheet $20_7$ installed on the fuel filter 21 may be installed inside the filter 21.

Thus, oxygen in the air sucked into the air cleaner 12 from the intake pipe 14 and oxygen contained in the recirculated combustion gas from the blow-by gas pipe 18 are irradiated with α-rays emerging from the sheets and transformed into active oxygen. At the same time, nitrogen contained in the air and combustion gas, respectively, are transformed into monatomic oxygen and hydrogen which will be sucked into the combustion chamber 15.

The sheet according to the present invention is made by solidifying with a coagulant, granules or powder of an ore containing 10 to 1,000 ppm of s natural radioactive element which emits radiation energies by alpha-decay, and shaping them into the form of a sheet.

The substance containing the natural radioactive element may be used in the form of powder or granules and mixed as filler in a molded synthetic resin, soft synthetic resin sheet, ceramic, filter enclosed in a permeable paper, etc. The substance may also be used in the form of powder and mixed in a paint.

It will be discussed below how the radiation energies caused by alpha-decay of the natural radioactive element reacts with air.

The natural radioactive element will spontaneously change into another element, then into still another element, . . . while emitting radiation energies such as α-rays, β-ray and γ-ray, and finally into lead, which will not change any more.

When air is irradiated with such radiation energies caused by the alpha-decay, diatomic oxygen in the air is reduced by a negative electron and transformed into a powerful oxidizing active oxygen($•O_2^-$) as in the following:

$$O_2 + e^- \rightarrow •O_2^-$$

Air contains about 21% oxygen and about 78% . Nitrogen when irradiated with the α-rays, the nitrogen atom having an atomic number 14 will undergo a fission-transformation into a highly reactive oxygen atom having an atomic number 17 and hydrogen atom having an atomic number 1 as in the following:

$$^{14}_{7}N + ^{4}_{2}He \longrightarrow ^{17}_{8}O + ^{1}_{1}H$$

It is considered that the above-mentioned combination of the transformation of the part of the nitrogen in the supplied air into oxygen and hydrogen and the transformation of the diatomic oxygen in air into the powerful oxidizing oxygen, will improve the fuel ignitability and combustion efficiency of the internal combustion engine and combustion equipment, to thereby reduce the amounts of hydrocarbon and carbon monoxide in the exhaust gas and that the exhaust gas is thus effectively cleaned and the rate of fuel consumption is improved.

More particularly, the monatomic oxygen ($^{17}O$) produced due to the atomic nucleus-transformation of the nitrogen will react with the carbon monoxide (CO) to produce carbon dioxide as in the following. In other words, the fuel will be completely burnt.

$$CO + O \rightarrow CO_2$$

Also, the active monatomic hydrogen ($_1^1H$) will easily combine with carbon and react with the hydrocarbon (HC), as in the following, to produce methane:

$$HC + 3H \rightarrow CH_4$$

The active oxygen ($•O_2^-$) will react with the methane, resulting in complete combustion.

More particularly, the hydrocarbon (HC) produced due to incomplete combustion is changed, due to the monatomic hydrogen, into a hydrocarbon ($C_nH_m$) and will burn again as a fuel.

In the passage downstream of the air inlet, the hydrocarbon will be burnt according to the following:

$$C_nH_m + (n+m/4)O_2 + 3.76(n+m/4)N_2 \rightarrow nCO_2 + (m/2)H_2O + 3.76(n+m/4)N_2$$

In air, each element is in an excited condition in which it shows a powerful oxidizing reaction. Also, since active oxygen which is capable of a powerful oxidizing reaction, is used, incomplete combustion can be prevented to improve the combustion efficiency of an internal combustion engine.

During incomplete combustion, the mixture of a fuel and air is influenced by steam in the cylinder to yield intermediate products such as formic acid and the like. The intermediate products $HNO_3$, $H_2SO_4$, HCOOH, etc. will cause the cylinder to be corroded or abraded. However, the radiation energy irradiated to the fuel and air permits the fuel to be burnt nearly completely, which avoids the problem of cylinder corrosion and abrasion.

Normally, large-scale equipment and high costs are required to produce monatomic oxygen and hydrogen. However, effective use of the radiation energies from a natural radioactive element permits cleaning of automatic exhaust gas at low costs and improve the rate of fuel consumption.

Figure 3:
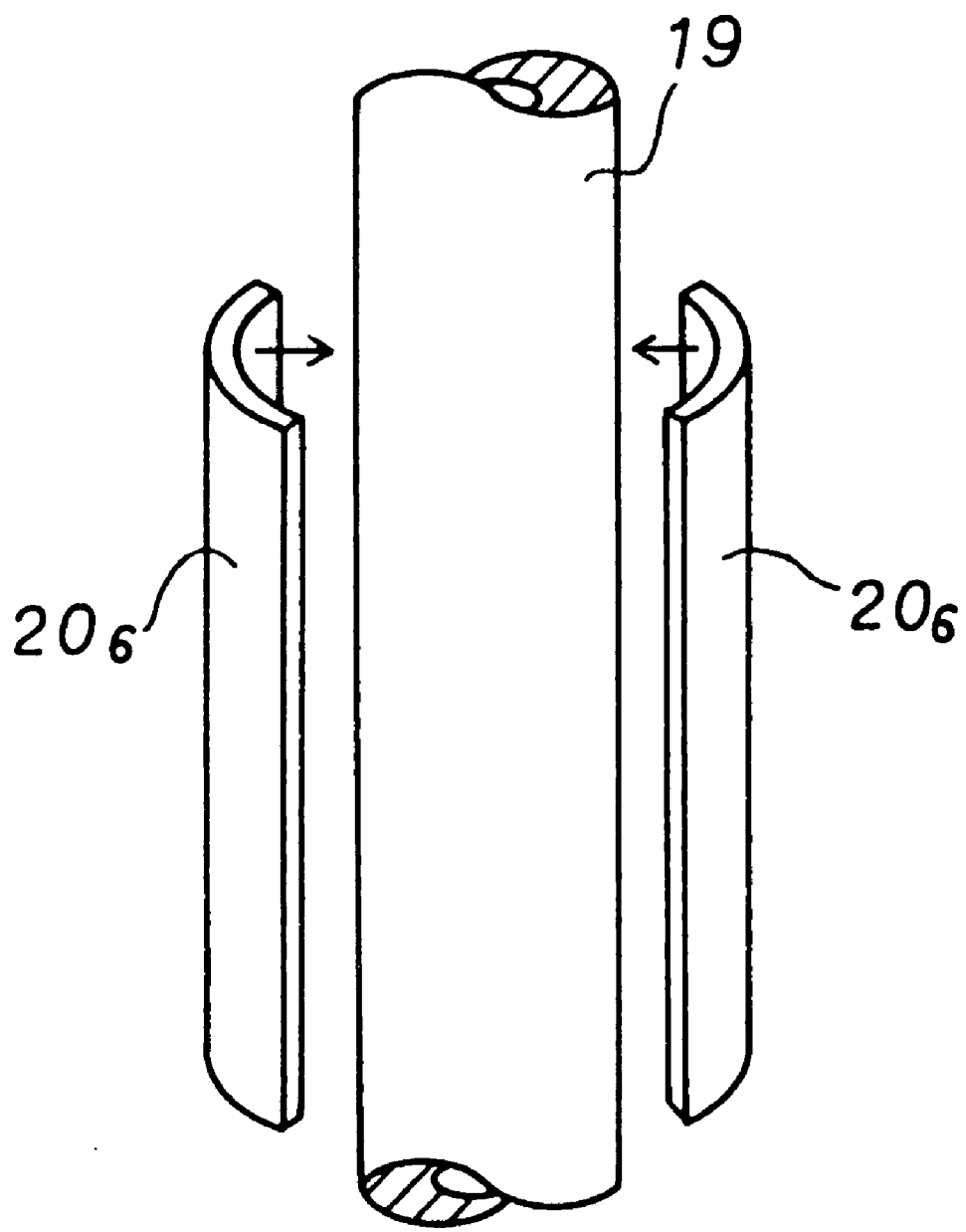
FIG. 3 is a perspective view showing a method for installing the sheet on the fuel pipe.

FIG. 3 schematically shows the method for installing the sheet according to the present invention on the fuel pipe through which fuel is supplied to a combustion equipment or internal combustion engine. As shown, the sheet $20_6$, which is made of a substance containing a natural radioactive element, (the sheet $20_6$ will be referred to as a "cleaning member" below) according to the present invention is closely attached to the outer surface of the fuel pipe 19 with an adhesive in such a manner that no air will remain between the cleaning member $20_6$ and fuel pipe 19.

The cleaning member $20_6$ is formed from a substance containing a natural radioactive element.

The cleaning member $20_6$, when closely attached to the outer surface of the fuel pipe 19, is capable of effectively cleaning exhaust gas as will be evident from the description of examples of experiments described herein. It is considered that the exhaust gas cleaning effect of the cleaning member $20_6$ results from to the promoted reactions of decomposition and bridging of hydrocarbon ($C_nH_m$) in fuel when the latter is irradiated with radiation energies ($\alpha$-, $\beta$- and $\gamma$-rays) caused by alpha-decay as well as from the ionization, excitation, etc. of hydrogen and oxygen atoms.

The substance containing the natural radioactive element, used which is to form the cleaning member $20_6$, should desirably have a radioactive half-life longer than the service life of the internal combustion engine, for example, and a radiation intensity which is not so great so that exposure to the radiation from the radioactive element will not be any problem. Namely, the cleaning member $20_6$ is made using an extremely small volume of the substance.

In the embodiment of the present invention, the cleaning member $20_6$ is installed on the outer surface of the fuel pipe 19, but it may be installed inside the fuel pipe 19 or a part of the fuel pipe 19 itself may be formed from the cleaning member $20_6$.

Figure 4:
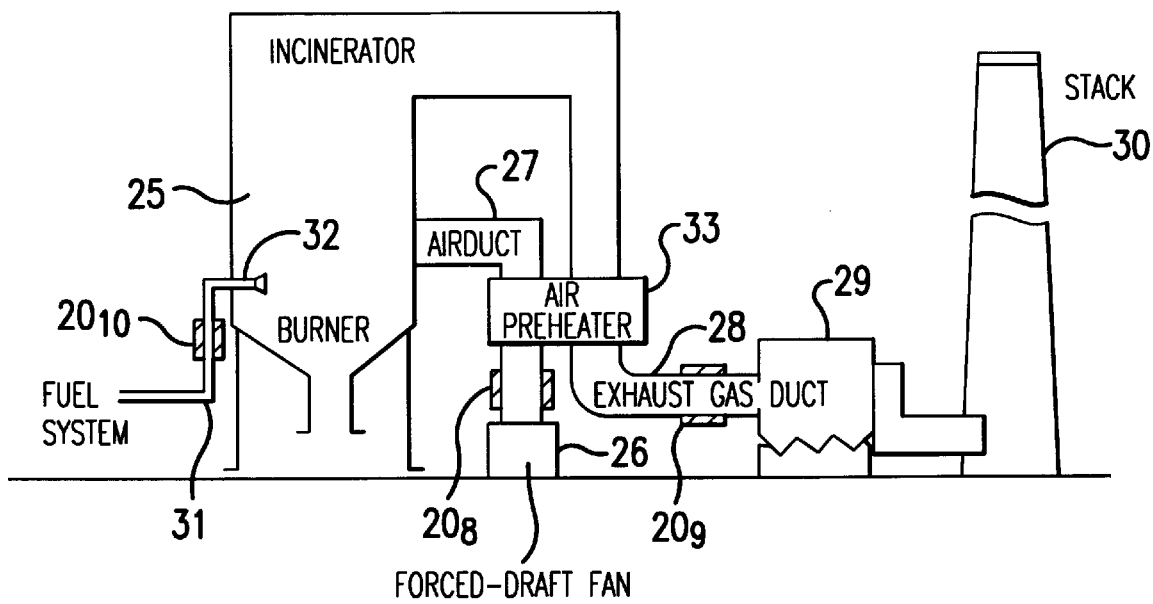
FIG. 4 is an explanatory drawing showing the sheet member installed in an incinerator.

FIG. 4 shows an example of the cleaning member made of a natural radioactive element, installed on the air supply, exhaust and fuel supply systems of an incinerator.

As seen, air supplied into an incinerator 25 from a forced-draft fan 26 through an air duct 27 and a fuel injected from a burner 32 installed in the incinerator 25 are mixed together inside the incinerator 25. The combustion gas resulting at an elevated temperature is passed through an exhaust gas duct 28, $NO_x$ and $SO_x$ remover 29 and the like, and discharged from a stack 30.

Cleaning members $20_8$ to $20_{10}$, which are made of a substance containing a natural radioactive element, are installed on an exhaust gas duct 28, air duct 27 and a fuel system 31, respectively. Air supplied from the air duct 27 into the incinerator 25 is activated with radiation energies caused by alpha-decay and hydrocarbon in a fuel injected from the burner 32 through the fuel system 31 whose burning is also promoted by radiation energies ($\alpha$-, $\beta$- and $\gamma$-rays) caused by alpha-decay.

Further, the combustion gas passing through the exhaust gas duct 28 is also activated with the radiation energies caused by alpha-decay, so the chemical reaction in the $NO_x$ and $SO_x$ remover 29 is promoted.

EXAMPLE OF EXPERIMENT 1

The cleaning member $20_6$ according to the embodiment shown in FIG. 3 was installed on a portion of the fuel pipe 19 near the 1600-cc engine of a 1994-type type HONDA Integra(registered trade mark). The cleaning member $20_6$ was made of a sand ore and coagulant made of silicon, PVC and 30% by weight of the other. After the car was driven for a period of one week, CO and HC in the exhaust gas were measured,

| | |
|---|---|
| CO (carbon monoxide) | 0.5% (before the cleaning member was installed) |
| | 0% (after the member was installed) |
| HC (hydrocarbon) | 100 ppm (before the member was installed) |
| | 0 ppm (after the member was installed) |

The following should be noted. Namely, when the cleaning member $20_6$ was attached to the fuel pipe 19, the speed in the slow-speed phase of the engine was increased. After the speed was adjusted, the exhaust gas during idling of the engine was measured (this was done commonly throughout all the experiments).

EXAMPLE 2

In this experiment, the cleaning member $20_6$ was similarly used on the 2000-cc engine of a 1988-type TOYOTA Crown Royal Saloon (registered trade mark). The amounts of CO and HC in the exhaust gas measured before the cleaning member was installed were found to have changed as follows after the member was installed:

| | | |
|---|---|---|
| CO | ... | 0.5% → 0.5% |
| HC | ... | 240 ppm → 0 ppm |

EXAMPLE 3

The cleaning member $20_6$ was similarly used on the 660-cc engine of a 1992-type DAIHATSU Mira (registered trade mark). The amounts of CO and HC in the exhaust gas measured before the cleaning member was installed were found to have changed as follows after the member was installed:

| | | |
|---|---|---|
| CO | ... | 1.6% → 0.05% |
| HC | ... | 300 ppm → 30 ppm |

EXAMPLE 4

The cleaning member $20_6$ was similarly used on the 2400-cc engine of a 1991-type TOYOTA Estima (registered trade mark). The amounts of CO and HC in the exhaust gas measured before the cleaning member were found to have changed as follows after the member was installed:

| | | |
|---|---|---|
| CO | ... | 0.04% → 0.03% |
| HC | ... | 10 ppm → 0 ppm |

EXAMPLE 5

The cleaning member $20_6$ was similarly used on the 1840-cc engine of a 1994-type NISSAN Premela (registered trade mark). The amounts of CO and HC in the exhaust gas measured before the cleaning member was installed were found changed as follows after the member was installed:

| | | |
|---|---|---|
| CO | ... | 0.09% → 0.02% |
| HC | ... | 130 ppm → 0 ppm |

In the experiments 1 to 5, each of the cars had a gasoline engine. On diesel-engine cars, the cleaning member could also be proved to clean exhaust gas. In addition, the sound from the diesel engines using the cleaning member according to the present invention was reduced. Moreover, the cleaning member was tested with the engines of concrete mixer trucks and dump trucks. The results proved that the black smoke from the concrete mixer truck engines was reduced from 23% to 1% and that from the dump truck engines was reduced from 43% to 1%. NoHC and CO were detected in the exhaust gas from these engines on which the cleaning member was installed.

A sheet of the cleaning member (300×300×2 mm in dimensions) designed for the radiation energies specified in Table 1 was tested in the Tsuchiura Works of the Kantetsu Automobiles industries Co., Ltd.

TABLE 1

|  | Radiation energy (in becquerels/cm$^2$) |
|---|---|
| α-ray | 0.01 to 0.02 |
| β-ray | 0.3 to 0.5 |
| γ-ray | 0.2 to 0.26 |

In the experiments, a MITSUBISHI Gallant (registered trade mark) with an 1800-cc gasoline engine, having more than 100,000 km, was used. The sheet of the cleaning member was attached on the box through which the air inlet of the gasoline engine is located. CO and HC were measured during idling of the engine before and after the sheet was installed. The amounts of CO and HC measured immediately after the sheet was installed and after about 10 minutes of driving, where as follows:

| CO | ... | 1.78% (immediatety after the sheet was installed) |
|---|---|---|
|  |  | 0.03% (after 10 minutes of driving) |
| HC | ... | 358 ppm (immediately after the sheet was installed) |
|  |  | 0 ppm (after 10 minutes of driving) |

A TOYOTA Cresta (registered trade name) with a 2000-cc engine, having been driven over a distance of about 40,000 km, was used to measure the performance of the sheet. The amounts of CO and HC measured immediately after the sheet was installed and after about 10 minutes of driving, were as follows:

| CO | ... | 0.68% (immediately after the sheet was installed) |
|---|---|---|
|  |  | 0.04% (after 10 minutes of driving) |
| HC | ... | 358 ppm (immediately after the sheet was installed) |
|  |  | 0 ppm (after 10 minutes of driving) |

Also, A TOYOTA Crown (registered trade name) with a 3000-cc engine, having been used for a run over a distance of about 26,000 km, was used to measure the performance of the sheet. The amounts of CO and HC measured immediately after the sheet was installed and after about 10 minutes of driving, are as follows:

| CO | ... | 0.3% (immediately after the sheet was installed) |
|---|---|---|
|  |  | 0.03% (after 10 minutes of driving) |
| HC | ... | 200 ppm (immediately after the sheet was installed) |
|  |  | 0 ppm (after 10 minutes of driving) |

Furthermore, the Nakanihon College of Automobiles tested a sheet having the same characteristics as that installed in the above-mentioned experiments in the Tsuchiura Works of the kantetsu Automobiles Co., Ltd. The sheet was installed on the car engine having the specifications shown below:

| Car manufacturer | Nissan |
|---|---|
| Engine Type | L18 (gasoline) |
| Cylinder inside dia. and stroke | 85 × 78 mm |
| Compression ratio | 8.5 |
| Maximum output | 105/6000 ps/rpm |
| Maximum torque | 15.0/3600 kgfm/rpm |
| Fuel consumption | 210/3200 g/ps.h |

The engine load and exhaust gas (CO and HC) measured before and after the sheet was installed are as shown in Table 2.

TABLE 2

| Engine load | Before sheet was installed | | After sheet was installed | |
|---|---|---|---|---|
| (kgfm/rpm) | CO (%) | HC (ppm) | CO (%) | HC (ppm) |
| 10/1500 | 0.05 | 170 | 0.03 | 110 |
| 10/2000 | 0.06 | 100 | 0.05 | 80 |
| 15/1500 | 0.04 | 140 | 0.02 | 120 |
| 15/2000 | 0.05 | 110 | 0.04 | 100 |

Note that use of the cleaning member $20_6$ similar to the above-mentioned sheet on the fuel pipe 19 and on the air inlet of an incinerator showed an improved cleaning of the exhaust gas and an improved rate of fuel consumption. For example, the cleaning member installed on the box of the air cleaner of the car permitted the car to run over a distance 20 to 60% longer per liter than when no cleaning member was used. This improvement is estimated to have been attained because the activation of oxygen in the supplied air contributed to the complete combustion of fuel, and the active monatomic hydrogen and oxygen contributed to the cleaning of HC and CO, respectively.

The cleaning member was also tested as used on a car which was driven on an ordinary road. The test method and results are as shown in Table 3.

TABLE 3

| Date of test | November 3, 1994 (weather: fine) |
|---|---|
| Car used for the test | TOYOTA Corona 2000 EF1, TR-X, automatic |
| Rate of fuel consumption | 12.0 kg/liter (10.15 mode) |
| Method | Distance of 20.2 kg on an ordinary road in Takamatsu City of Kagawa prefecture The car was driven on the same road and returned at a point of 10 km. The car was fully primed at a same place in a gas station. Three persons rode in the car. |
| Test results | Before the sheet was installed |
|  | Fuel consumption     1.8 liters |
|  | Rate of fuel consumption     11.22 km/liter |
|  | After the sheet was installed |
|  | Fuel consumption     1.13 liters |
|  | Rate of fuel consumption     17.87 km/liter |
|  | Reduction of fuel consumption     59.29% |

The data showing the improvement in rate of fuel consumption after the sheet was installed in various cars are shown in Table 4.

TABLE 4

|  | Cubic capacity (cc) | Rate of fuel consumption (km/liter) | |
| --- | --- | --- | --- |
| Car | | Before the sheet was installed | After the sheet was installed |
| Benz | 2000 | 5.4 | 9.8 |
| Cadillac | 6000 | 2.0 | 8.0 |
| Mitsubishi Mirage | 1300 | 8.0 | 10.7 |
| SUBARU Impressor | 1800 | 7.79 | 10.11 |
| TOYOTA Celcio | 4000 | 5.95 | 7.74 |
| TOYOTA Cresta | 2500 | 6.75 | 9.43 |
| ISUZU, diesel | 2770 | 10.65 | 13.8 |
| HINO, diesel | 7000 | 3.5 | 4.97 |

What is claimed is:

1. An exhaust gas cleaning apparatus, comprising a radioactive material in combination with and proximate to at least one member selected from the group consisting of a member for supplying air, a member for removing exhaust, a member for providing fuel, a member for removing fuel, a member for filtering fuel and a member for recirculating combustion gas, said radioactive material being capable of emitting radiation as a result of undergoing alpha-decay and transforming diatomic oxygen into an oxidizing active oxygen while transforming, by fission, nitrogen into a monatomic oxygen and monatomic hydrogen.

2. The apparatus of claim 1, wherein the radioactive material is powdered or granulated radioactive material and the powdered or granulated radioactive material is either mixed with a coagulant and shaped into a sheet, mixed as filler in a molded synthetic resin, a soft synthetic resin sheet, or a ceramic, or the powdered or granulated radioactive material is enclosed in a permeable paper, or the powdered radioactive material is mixed in a paint.

3. The apparatus of claim 2, wherein the radioactive material emits 0.001 to 0.6 becquerels of $\alpha$-rays.

4. A method for cleaning exhaust gas produced by combustion equipment, comprising the steps of:

supplying air to an air inlet of said combustion equipment to cause air to flow through the air inlet;

irradiating the air flowing through the air inlet using radiation emitted as a result of alpha-decay of a radioactive material, thereby transforming diatomic oxygen in the air into an oxidizing active oxygen while transforming, by fission, nitrogen in the air into a monatomic oxygen and monatomic hydrogen, and providing the combustion equipment with the air containing the active oxygen, monatomic oxygen and hydrogen for reducing toxic components from the exhaust gas.

5. The method of claim 1, wherein the radioactive material is mixed with a coagulant and formed into a sheet which emits 0.001 to 0.6 becquerels of $\alpha$-rays.

* * * * *